(12) United States Patent  
Uusitalo et al.

(10) Patent No.: US 8,571,467 B2  
(45) Date of Patent: Oct. 29, 2013

(54) METHOD AND APPARATUS FOR COGNITIVE RADIO INFORMATION SHARING

(75) Inventors: Mikko Aleksi Uusitalo, Helsinki (FI); Sergey Boldyrev, Söderkulla (FI); Jari-Jukka Harald Kaaja, Järvenpää (FI); Ian Justin Oliver, Söderkulla (FI)

(73) Assignee: Nokia Corporation, Espoo (FI)

( * ) Notice: Subject to any disclaimer, the term of this patent is extended or adjusted under 35 U.S.C. 154(b) by 16 days.

(21) Appl. No.: 13/075,723

(22) Filed: Mar. 30, 2011

(65) Prior Publication Data

US 2012/0252508 A1   Oct. 4, 2012

(51) Int. Cl.  
*H04H 40/00* (2008.01)

(52) U.S. Cl.  
USPC .......................................... 455/3.06; 455/454

(58) Field of Classification Search  
USPC ........................................ 455/514, 509, 3.06  
See application file for complete search history.

(56) References Cited

U.S. PATENT DOCUMENTS

| | | |
|---|---|---|
| 2009/0034508 A1 | 2/2009 | Gurney et al. |
| 2009/0124208 A1 | 5/2009 | Mody et al. |
| 2009/0180359 A1 | 7/2009 | Walter |
| 2010/0069013 A1 | 3/2010 | Chaudhri et al. |
| 2010/0238798 A1 | 9/2010 | Ahuja et al. |
| 2010/0306278 A1 | 12/2010 | Oliver et al. |
| 2010/0330919 A1 | 12/2010 | Gurney et al. |
| 2011/0138183 A1 | 6/2011 | Reddy et al. |
| 2011/0319114 A1* | 12/2011 | Tavildar et al. ............... 455/514 |
| 2012/0165056 A1 | 6/2012 | Kim et al. |
| 2012/0230250 A1 | 9/2012 | Kasslin et al. |

FOREIGN PATENT DOCUMENTS

WO   WO 2008/039872 A2   4/2008

OTHER PUBLICATIONS

Extended European Search Report for EP 12 16 1740 dated Jun. 25, 2012, pp. 1-18.  
Hiroshi Harada, "Cognitive Wirelss Cloud: A Network Concept to Handle Heterogenerous and Spectrum Sharing Type Radio Access Networks", IEEE 20th International Symposium on Personal Indoor and Mobile Radio Communications, Piscataway, NJ, USA, Sep. 13, 2009, pp. 1-5.  
Akyildiz, Ian F. et al., "Cooperative Spectrum Sensing in Cognitive Radio Networks: A Survey", 2010.  
Brown, Timothy X. et al., "Potential Cognitive Radio Denial-of-Service Vulnerabilities Protection Countermeasures: A Multi-dimensional Analysis and Assessment", 2008.  
Burbank, Jack L., "Security in Cognitive Radio Networks: The Required Evolution in Approaches to Wireless Network Security", 2008.

(Continued)

*Primary Examiner* — Tu X Nguyen  
(74) *Attorney, Agent, or Firm* — Ditthavong Mori & Steiner, P.C.

(57) ABSTRACT

An approach is provided for providing cognitive radio information sharing. A cognitive radio management platform determines one or more cognitive radio parameters associated with one or more locations. The cognitive radio management platform also causes, at least in part, storage of the one or more cognitive radio parameters in at least one distributed information space constituted by one or more namespaces, wherein the one or more namespaces within the at least one distributed information space are accessible to one or more cognitive radio devices.

20 Claims, 10 Drawing Sheets

(56) References Cited

OTHER PUBLICATIONS

Ersoz, Seda Dmirag et al., "Secure Spectrum Sensing and Decision in Cognitive Radio Networks", Jun. 2010.

Kim, Hyun Sung, "Location-based Authentication Protocol for First Cognitive Radio Networking Standard", 2010.

Office Action for related U.S. Appl. No. 13/149,362 dated Jan. 16, 2013, pp. 1-99.

* cited by examiner

METHOD AND APPARATUS FOR COGNITIVE RADIO INFORMATION SHARING

BACKGROUND

Mobile devices with various methods of connectivity are now for many people becoming the primary gateway to the internet and also a major storage point for personal information. This is in addition to the normal range of personal computers and furthermore sensor devices plus internet based providers. Combining these devices together and lately the applications and the information stored by those applications is a major challenge of interoperability. This can be achieved through numerous, individual and personal information spaces in which persons, groups of persons, etc. can place, share, interact and manipulate (or program devices to automatically perform the planning, interaction and manipulation of) webs of information with their own locally agreed semantics without necessarily conforming to an unobtainable, global whole.

Furthermore, in addition to information, the information spaces may be combined with webs of shared and interactive computations or computation spaces so that the devices having connectivity to the computation spaces can have the information in the information space manipulated within the computation space environment and the results delivered to the device, rather than the whole process being performed locally in the device. It is noted that such computation spaces may consist of connectivity between devices, from devices to network infrastructure, to distributed information spaces so that computations can be executed where enough computational elements are available. These combined information spaces and computation spaces often referred to as computation clouds, are extensions of the 'Giant Global Graph' in which one can apply semantics and reasoning at a local level.

Networks composed of mobile and immobile devices associated with the wide spectrum of distributed information and computation spaces communicate with each other via methods of connectivity based on various paradigms of communication (or radio) such as, for example, cognitive radio wave, telephony, fiber optics, orbiting satellites, the Internet, etc. A recent development in radio communication technology referred to as "cognitive radio" provides a paradigm for wireless communication in which either a network or a wireless node changes its transmission or reception parameters to communicate efficiently while avoiding interference with other users, either licensed or unlicensed. In one embodiment, this alteration of parameters is based, at least in part, on the active monitoring of several factors in the external and internal radio environment, such as radio frequency spectrum, user behavior and network state. By way of example, cognitive radio can provide many advantages over traditional radio communication paradigms, for example, by (1) enabling use of all available frequencies leading to efficient use of the radio spectrum, (2) providing each user with the optimal connectivity for the use and the occasion, (3) providing easy access control and identification management, (4) providing new levels of interaction among various radio types, etc. Because of the benefits of cognitive radio, many network managers may opt for using cognitive radio as their preferred way of communication. However, service providers and device manufacturers face significant technical challenges to recording and/or sharing cognitive radio parameters and related information among participating communication nodes to ensure efficient use of available radio frequencies.

SOME EXAMPLE EMBODIMENTS

Therefore, there is a need for an approach for providing cognitive radio information sharing via information spaces.

According to one embodiment, a method comprises determining one or more cognitive radio parameters associated with one or more locations. The method also comprises causing, at least in part, storage of the one or more cognitive radio parameters in at least one distributed information space constituted by one or more namespaces, wherein the one or more namespaces within the at least one distributed information space are accessible to one or more cognitive radio devices.

According to another embodiment, an apparatus comprises at least one processor, and at least one memory including computer program code, the at least one memory and the computer program code configured to, with the at least one processor, cause, at least in part, the apparatus to determine one or more cognitive radio parameters associated with one or more locations. The apparatus also causes, at least in part, storage of the one or more cognitive radio parameters in at least one distributed information space constituted by one or more namespaces, wherein the one or more namespaces within the at least one distributed information space are accessible to one or more cognitive radio devices.

According to another embodiment, a computer-readable storage medium carries one or more sequences of one or more instructions which, when executed by one or more processors, cause, at least in part, an apparatus to determine one or more cognitive radio parameters associated with one or more locations. The apparatus also causes, at least in part, storage of the one or more cognitive radio parameters in at least one distributed information space constituted by one or more namespaces, wherein the one or more namespaces within the at least one distributed information space are accessible to one or more cognitive radio devices.

According to another embodiment, an apparatus comprises means for determining one or more cognitive radio parameters associated with one or more locations. The apparatus also comprises means for causing, at least in part, storage of the one or more cognitive radio parameters in at least one distributed information space constituted by one or more namespaces, wherein the one or more namespaces within the at least one distributed information space is are accessible to one or more cognitive radio devices.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of claims 1-10.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing cognitive radio information sharing are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
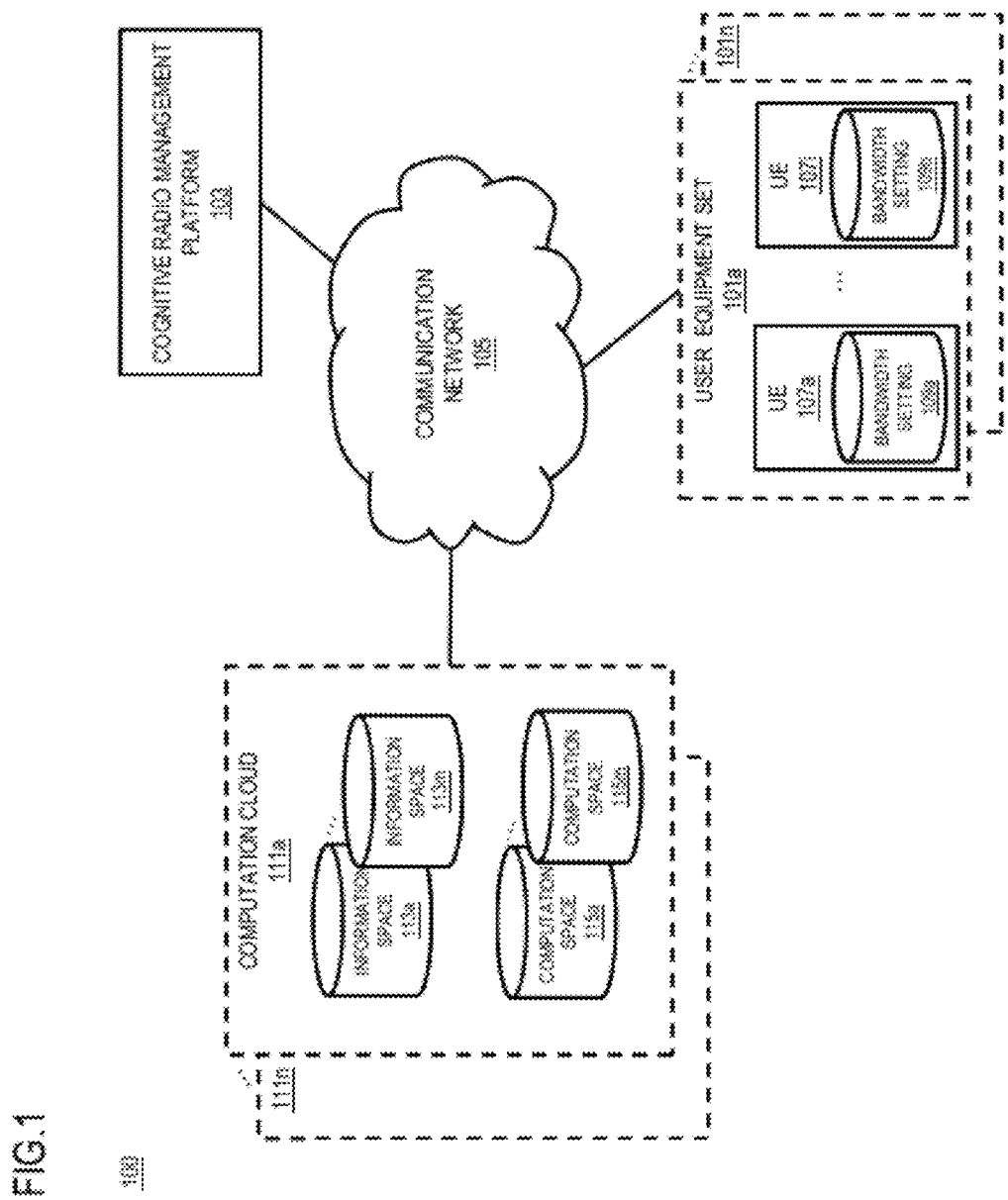
FIG. 1 is a diagram of a system capable of providing cognitive radio information sharing, according to one embodiment.

FIG. 1 is a diagram of a system capable of providing cognitive radio information sharing, according to one embodiment. Under traditional radio communication protocols, mobile devices generally are limited to using certain frequencies for communication which may cause high network traffic. For example, new music and video services on the Internet may require far more bandwidth than is available on the networks. As noted above, cognitive radio technology can be used to overcome some of the limitations of traditional wireless communications. For example, cognitive radio enables the devices to use all available frequencies even those dedicated to special services such as, for example, television (TV), satellites, etc. to support communications. More specifically, cognitive radio devices typically determine locally available radio spectrum and then negotiate with each other and/or with network management components in order to use the available radio spectrum in the most efficient way.

In one embodiment, cognitive radio may provide the possibility to multiply the current network speeds and/or capacity. For example, cognitive radio technology can be configured to understand the language of any radio protocol. This characteristic of the cognitive radio, combined with new simple radios embedded in any object, can provide interaction between any physical objects. This can also provide solutions for communication between people using communication devices with different setups, such as for example, different languages and cultures, etc.

For example, at a big event such as a concert or a sports event the local network may get overloaded. Based on the current spectrum usage limitations, the provided capacity may not be enough for all the users. In one embodiment, cognitive radio technology can use all available frequencies and connectivity methods. It can quickly adapt to the unusual situation and ensure proper operation of the networks. The devices can connect not only through the network cells, but also by forming spontaneous networks. This enables many more users to transmit information such as, for example, messages, phone calls, real time video streams, etc.

Furthermore, the cognitive connectivity and radio communication paradigm generally provides and/or relies on location dependent information on available bandwidth, rules, and tuning setups associated with a communication network. Accordingly, a cognitive radio enabled system often is equipped with one or more centralized databases in addition to local coexistence management for every device to interact and request operational parameters. More specifically, cognitive radio enabled devices can request and/or inform their (spectrum) findings to the cognitive radio database and local coexistence management, and in return receive settings and other response information to configure devices and utilize settings correctly at certain locations, which are under certain regulations. These interactions often involve sharing and/or distributing cognitive radio information among participating devices. Therefore, there is a need for an approach for integrating services and architectures to offer cognitive connectivity with other existing systems to provide more efficiency, flexibility and scalability.

To address this problem, a system 100 of FIG. 1 introduces the capability to share cognitive radio information via information spaces in a distributed information and/or computation environment (e.g., cloud computing environment).

The cloud computing environments provide aggregated sets of information (information spaces) and computations (computation spaces) from different sources. This multi-sourcing is very flexible since it accounts and relies on the observation that the same piece of information or computation can come from different sources. In one embodiment, information and computations within the cloud are represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information and computations that is implemented in web resources; using a variety of syntax formats.

The basic concept of information space technology provides access to distributed information for various devices within the scope of the cloud, in such a way that the distributed nature of the information is hidden from users and it appears to a user as if all the information exist on the same device. The information spaces also enable a user to have control over information distribution by transferring information between devices that the user has access to. For example, a user may want to transfer information among work devices, home devices, and portable devices, other private and public devices, etc. Furthermore, as computing environments become more and more personalized as well as localized, the need for more sophisticated sharing mechanisms between information spaces increases. These sharing mechanisms while at the outset appear to be simple union and partitioning of the information proved more difficult because of the internal interactions of the information and the semantic structures governing that information. For example, operations such as split (dividing an information space into two or more smaller information spaces), merge (joining two or more information spaces into larger information spaces), projection (extracting information from an information space), injection (adding information to an existing information space), etc. facilitate sharing information among devices.

In one embodiment, cognitive radio enabled communication networks interact with the information spaces of a cloud environment, create mappings between related architectures, find commonalities in order to determine how cognitive radio can fit into wireless mobile environments (e.g., via platform application programming interfaces (APIs) such as core APIs and/or mobile functionality specific APIs, wherein platform APIs add mobile device features to the standard application development platforms).

In one embodiment, a distributed information space is constituted by different namespaces, wherein a namespace is an abstract environment holding logical groupings of unique identifiers associated with the information space content. In this embodiment, the information associated with cognitive radio (e.g. cognitive radio parameters) may be stored in different namespaces associated with distributed information spaces and the namespaces within the distributed information spaces are accessible to one or more cognitive radio enabled devices so that the cognitive radio enabled devices can use the stored parameters for communication within the wireless environment.

In one embodiment, integrated services and architectures enable the cognitive radio communication networks and other systems such as distributed information spaces and communication spaces in a cloud environment to communicate with each other via a common language. In this way, information spaces or cloud entities can be considered as aggregated information sets from different sources. In one embodiment, this multi-sourcing provides considerable flexibility by enabling the same piece of information to come from different sources.

It is noted that cognitive radio may use any available radio spectrum. For example, in the United States, cognitive radio devices include TV band devices (TVBDs) that can use available TV white space spectrum (or the unused TV spectrum) for communications. To facilitate such use, a cognitive radio database can be created to record uses or applications of the TV white space to ensure that cognitive radio uses do not interfere with other uses of the same radio frequencies (e.g., for TV broadcasts, etc.) In other words, the application of cognitive radio technology to white spaces may provide intelligent combination of the white spaces with other licensed and unlicensed bands to increase total system capacity and reliability. Additionally, cognitive radios can be programmed to select channels with the least congestion, longest range, most robust connection or a combination thereof, which may enable the users to get the most reliability and capacity possible in any situation. Implementing a cognitive radio system in conjunction with the guidance of a central database can significantly improve the efficiency of wireless spectrum. Cognitive radio technologies take TV white space beyond simple database control, thus helping unleash the full potential of white space as a broadband delivery system.

As shown in FIG. 1, one or more user equipment (UEs) 107*a*-107*i* may have access to cognitive radio information via clouds 111*a*-111*n*, which in turn include information spaces 113*a*-113*m* and computation spaces 115*a*-115*m*. By way of example, the cognitive radio information can include, at least in part, a cognitive connectivity white space database architecture, other cognitive connectivity information, or a combination thereof. In one embodiment, the cognitive radio management platform 103 provides accessibility to the information via clouds 111*a*-111*n* comprising one or more information spaces, computation spaces, or a combination thereof. In one embodiment, the clouds 111*a*-111*n* provide means for the UEs 107*a*-107*i* to exchange information with their local surroundings including information associated with cognitive connectivity.

In one embodiment, the cognitive radio information may include and/or the cognitive radio structure may utilize services provided by the Wireless Universal Resource File (WURFL), which has been developed for presenting information about capabilities and/or features of a wide variety of wireless devices. However, the information included in the WURFL generally does not include locally determined cognitive radio information. Accordingly, various embodiments of the approach described herein can supplement or otherwise leverage external data sources such as WURFL to provide cognitive radio information.

For example, in one embodiment, the cognitive radio management platform 103 extracts cognitive radio specific services from the WURFL and moves and/or translates the cognitive radio parameters into cognitive radio specific expressions (formats), wherein the cognitive radio specific parameters may include location, frequencies, regulations, legislations, etc. or any combination of one or more of these parameters.

In various embodiments, the cognitive radio management platform 103 may extract cognitive radio parameters via different methods such as sniffing, interrogation, or a combination thereof, wherein sniffing involves scanning the environment, whereas interrogation provides more local and global interactions and selection of user setups. It is noted that sniffing can be considered as a subset of interrogation, since interrogation provides more information.

In one embodiment, the cognitive radio management platform 103 enables local sharing of the cognitive radio spectrum and UEs 107a-107i settings. In this embodiment, the clouds 111a-111n (e.g., information spaces and/or computation spaces) provide local and global interactions or a combination of the two, where connected and agreed locally. This provides a broader information sharing structure compared to, for example, what WURFL provides. It is noted that cognitive radio structure can utilize WURFL as a service. WURFL may access to FIG. 2 remote backend, providing then direct cognitive radio specific access to device with necessary parameters.

As shown in FIG. 1, the system 100 comprises sets 101a-101n of user equipments (UEs) 107a-107i having connectivity to the cognitive radio management platform 103 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 107a-107i are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UEs 107a-107i, and the cognitive radio management platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
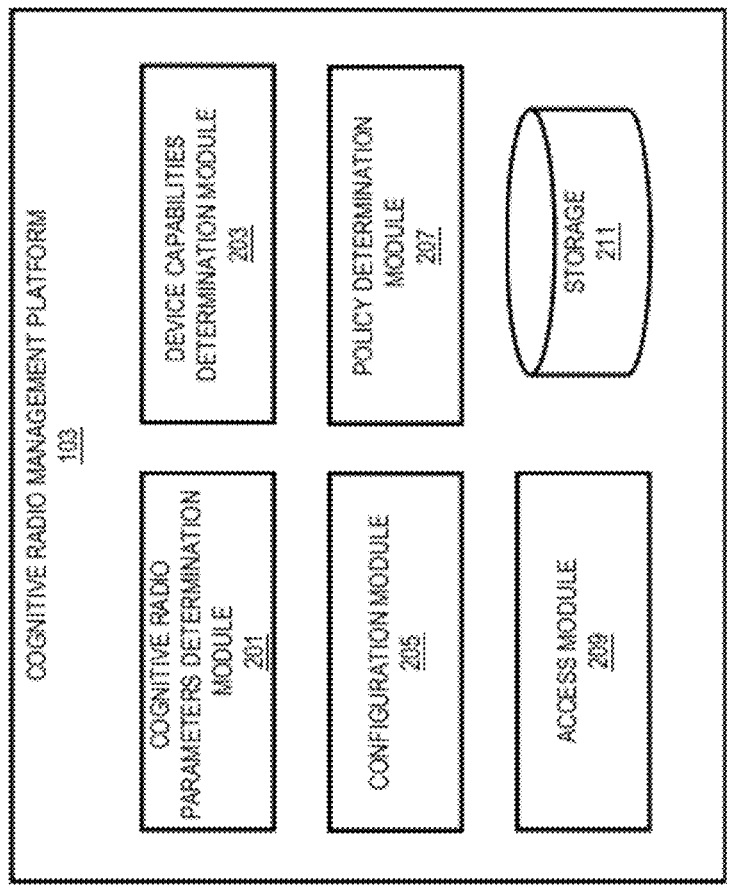
FIG. 2 is a diagram of the components of cognitive radio management platform, according to one embodiment.

FIG. 2 is a diagram of the components of cognitive radio management platform, according to one embodiment. By way of example, the cognitive radio management platform 103 includes one or more components for providing cognitive radio information sharing. It is contemplated that the functions of these components may be combined in one or more components or performed by other components of equivalent functionality. In this embodiment, the cognitive radio management platform 103 includes a cognitive radio parameters determination module 201, a device capabilities determination module 203, a configuration module 205, a policy determination module 207, an access module 209, and a storage 211.

Figure 3:
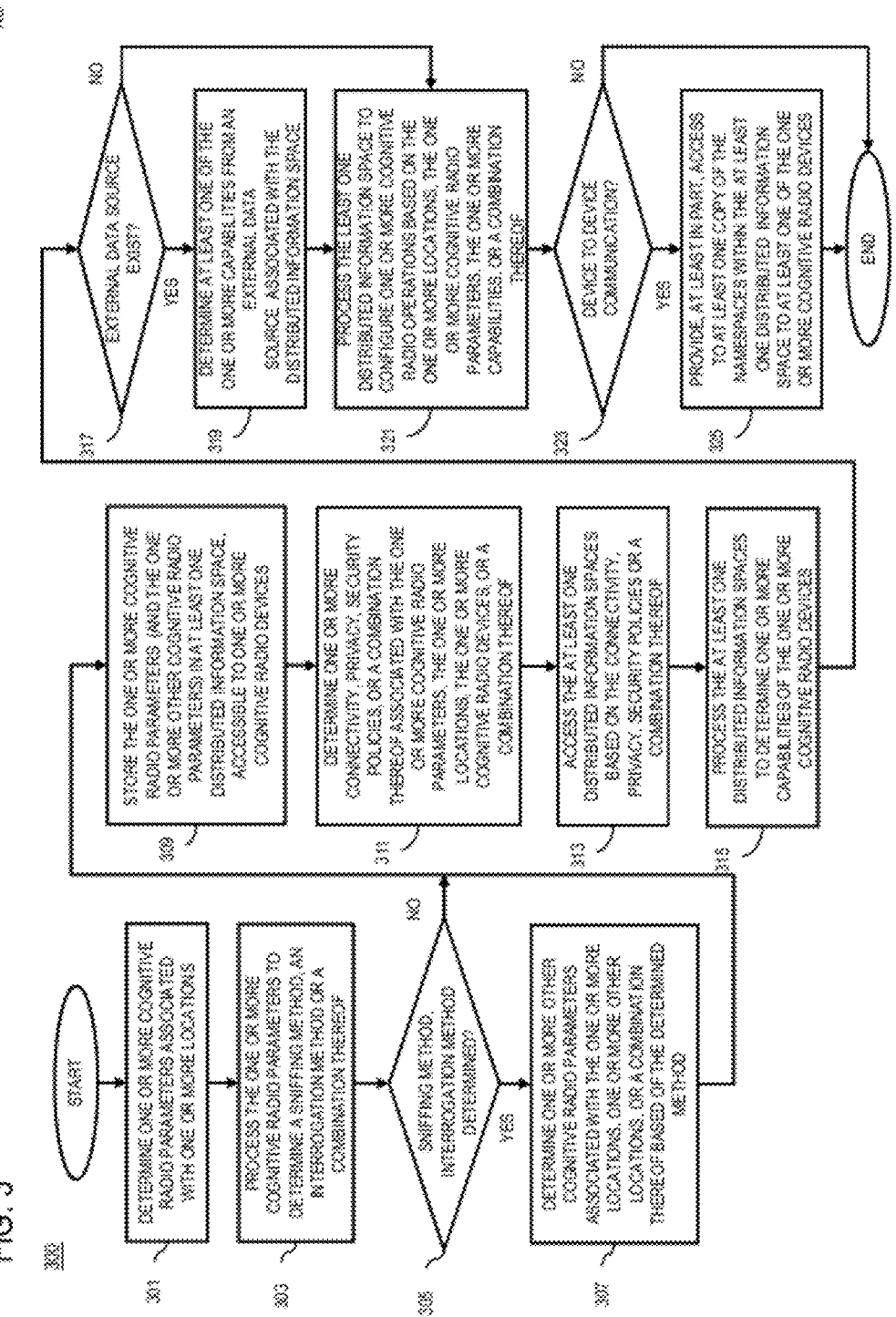
FIG. 3 is a flowchart of a process for providing cognitive radio information sharing, according to one embodiment.
Figure 8:
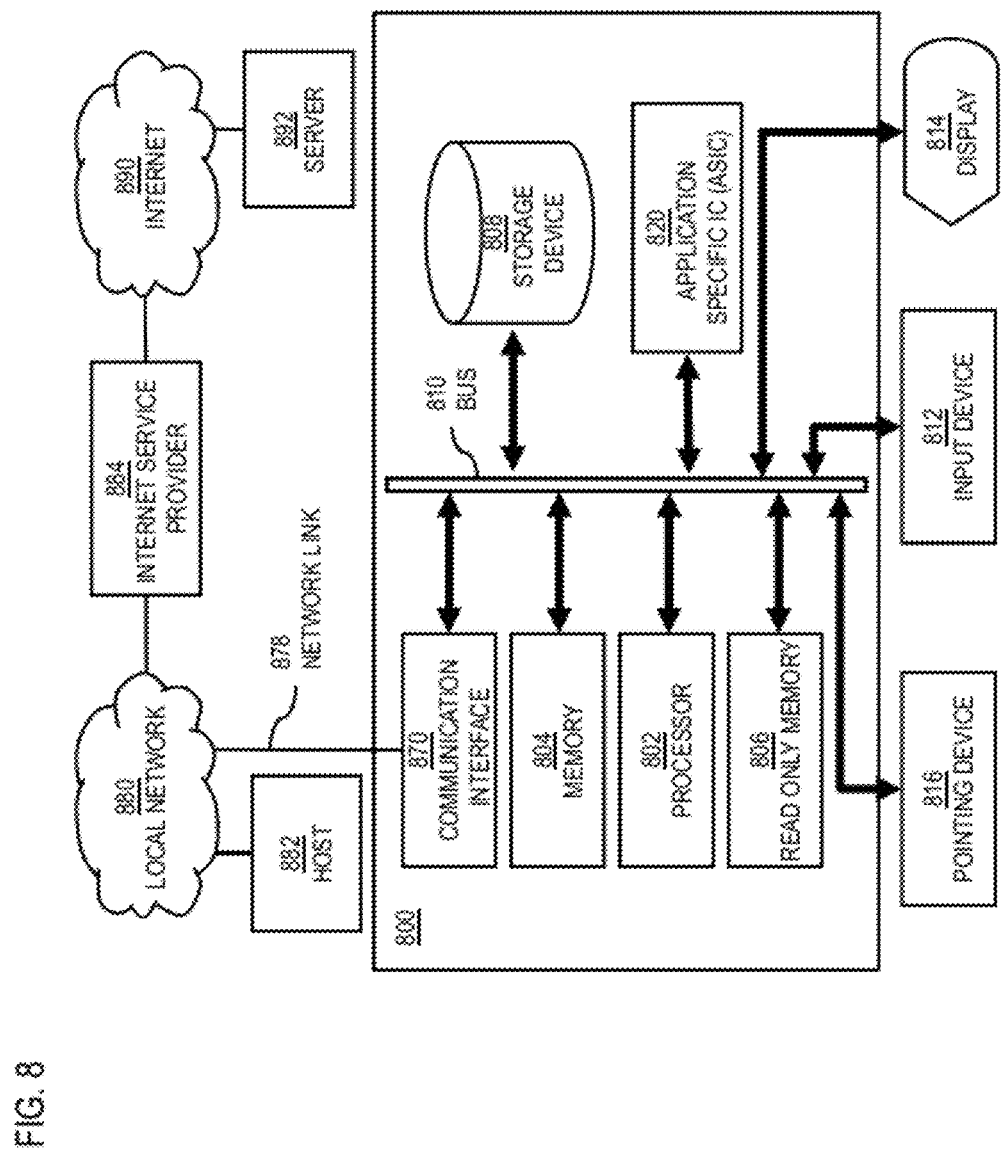
FIG. 8 is a diagram of hardware that can be used to implement an embodiment of the invention.

FIG. 2 is described with reference to FIG. 3, wherein FIG. 3 shows a flowchart of a process for providing cognitive radio information sharing, according to one embodiment. In one embodiment, the cognitive radio management platform 103 performs the process 300 and is implemented in, for instance, a chip set including a processor and a memory as shown in FIG. 8. In one embodiment, per step 301 of FIG. 3, the cognitive radio parameters determination module 201 determines one or more cognitive radio parameters associated with one or more locations. The cognitive radio parameters may include, at least in part, one or more regulations, one or more frequencies, or a combination thereof for communicating among one or more radio devices (e.g. UEs 107a-107i) at the one or more locations. The parameters may also include available bandwidth at each specific location, rules and regulations that govern bandwidth use by various devices (e.g. restrictions, usage plans, privileges, etc.) at the location, etc. The cognitive radio parameters enable the UEs 107a-107i to interact with each other and with computation clouds 111a-111n via cognitive radio. These parameters may also be used for mapping between various architectures, enhancing the capabilities of application development platforms to become compatible with platform APIs such as core APIs and/or mobile functionality specific APIs, etc. The cognitive radio parameters may have been initially assigned and stored in storage 211, in information spaces 113a-113m of computation clouds 111a-111n, or a combination thereof.

In one embodiment, the cognitive radio parameters may provide guidelines and methods for determining other cognitive radio parameters. For example, as seen in step 303 of FIG. 3, in one embodiment the cognitive radio parameters determination module 201 processes and/or facilitates processing of the one or more cognitive radio parameters to determine a sniffing method, an interrogation method, or a combination thereof for determining one or more other cognitive radio parameters associated with the one or more locations, one or more other locations, or a combination thereof.

It is noted that sniffing (e.g. radio sensing) may include interception and logging of traffic passing over a network (e.g. WURFL traffic, traffic over the TV white space, etc.) in order to capture the cognitive radio parameters. The captured parameters can then be analyzed and translated into cognitive radio specific expressions. Alternatively, or additionally, the cognitive radio management platform 103 may use interrogation methods for cognitive radio parameter interaction, wherein interrogation involves collection of knowledge about occupied channels (e.g. channel numbers, users identities, etc.), informing other entities of the knowledge, providing protocols for negotiation with other entities and negotiating with other entities via certain rules, configurations, etc.

In one embodiment, if step 305 of FIG. 3 shows that the processing of cognitive radio parameters by the cognitive radio parameters determination module 201 results in one or more sniffing and/or interrogation methods, per step 307 of FIG. 3, the cognitive radio parameters determination module 201 determines one or more other cognitive radio parameters associated with the one or more locations, one or more other locations, or a combination thereof based of the determined method.

In one embodiment, per step 309 of FIG. 3, the cognitive radio parameters determination module 201 stores the one or more cognitive radio parameters (and the one or more other cognitive radio parameters) in at least one information space 113a-113m, storage 211, or a combination thereof, wherein the parameters are accessible to one or more cognitive radio enabled UEs 107a-107i.

In one embodiment, per step 311 of FIG. 3, the policy determination module 207 determines one or more connectivity policies, one or more privacy policies, one or more security policies, or a combination thereof associated with the determined one or more cognitive radio parameters, the one or more locations, the one or more cognitive radio enabled UEs 107a-107i, or a combination thereof, wherein access to the at least one cloud 111a-111n is based, at least in part, on the one or more connectivity policies, the one or more privacy policies, the one or more security policies, or a combination thereof. In one embodiment, the policies are applied on any information that is being shared between and/or accessed by UEs 107a-107i, clouds 111a-111n, etc. The policies may be defined by the users of UEs 107a-107i, by cloud management entities (not shown) information/service providers (not shown), or a combination thereof. For example, location related policies may provide instructions on information extraction at the location, information preservation at the location, and information sharing methods among various devices at the location.

In one embodiment, per step 313 of FIG. 3, the cognitive radio management platform 103 accesses the at least one information spaces 113a-113m of the clouds 111a-111n based on the connectivity policies, the privacy policies, the security policies or a combination thereof.

In one embodiment, per step 315 of FIG. 3, the device capability determination module 203 processes and/or facilitates processing of the at least one accessed information spaces 113a-113m to determine one or more capabilities of the one or more cognitive radio enabled UEs 107a-107i, wherein an operation of at least one of the one or more cognitive radio enabled UEs 107a-107i is based, at least in part, on the one or more capabilities.

In one embodiment, per step 317 of FIG. 3, the device capabilities determination module 203, verifies whether device capabilities may be extracted from any external data sources associated with clouds 111a-111n. For example, the capabilities of the cognitive radio enabled UEs 107a-107i may be extracted from the WURFL database. As previously explained, the cognitive radio structure may utilize services provided by external sources, such as the Wireless Universal Resource File (WURFL). In this embodiment, the device capabilities determination module 203 may extract information associated with cognitive radio capabilities of UEs 107a-107i from the WURFL, per step 319 of FIG. 3, and translate the extracted information into the cognitive radio specific expressions. Subsequently, the extracted capabilities may be stored in storage 211, in cloud 111a-111n or a combination thereof and utilized for the operation of UEs 107a-107i based on the cognitive radio paradigm.

In one embodiment, per step 321 of FIG. 3, the configuration module 205 processes and/or facilitates a processing of the least one information space 113a-113m of clouds 111a-111n to cause, at least in part, configuring of one or more cognitive radio operations of the UEs 107a-107i based, at least in part, on the one or more locations, the one or more cognitive radio parameters, the one or more capabilities, or a combination thereof. The configuration enables the cognitive radio enabled UEs 107a-107i to utilize settings correctly at certain locations, under certain regulations and policies, based on their capabilities.

In one embodiment, per step 323 of FIG. 3, the access module 209 checks whether support for at least one device-to device communication among UEs 107a-107i is needed. In this case, per step 325 of FIG. 3, the access module 209 determines to provide, at least in part, access to at least one copy of the at least one information space 113a-113m to at least one of the one or more cognitive radio enabled UEs 107a-107i. In this embodiment, two or more devices 107a-107i may request direct subscription for device to device communication from the cognitive radio management platform 103. Subsequently the cloud 111a-111n determines equivalent parameters for communicating UEs and enables the devices to communicate directly. If no related parameters are found, the access module 209 provides connection to the local storage of UEs 107a-107i. Subsequently, the provided copy of the information spaces 113a-113m (or the local storage) provides various supports for UEs 107a-107i involved in a device-to-device direct communication.

In one embodiment, the cognitive radio enabled UEs 107a-107i may be equipped with one or more radio frequency (RF) memory tags. In this case the at least one information space 113a-113m of clouds 111a-111n extends, at least in part, to include the one or more radio frequency (RF) memory tags for storing personal information, private information, or a combination thereof associated with the at least one information space, the one or more cognitive radio parameters, the one or more locations, the one or more cognitive radio enabled UEs, or a combination thereof. In one embodiment, the one or more cognitive radio enabled UEs 107a-107i may include one or more television band devices.

Figure 4:
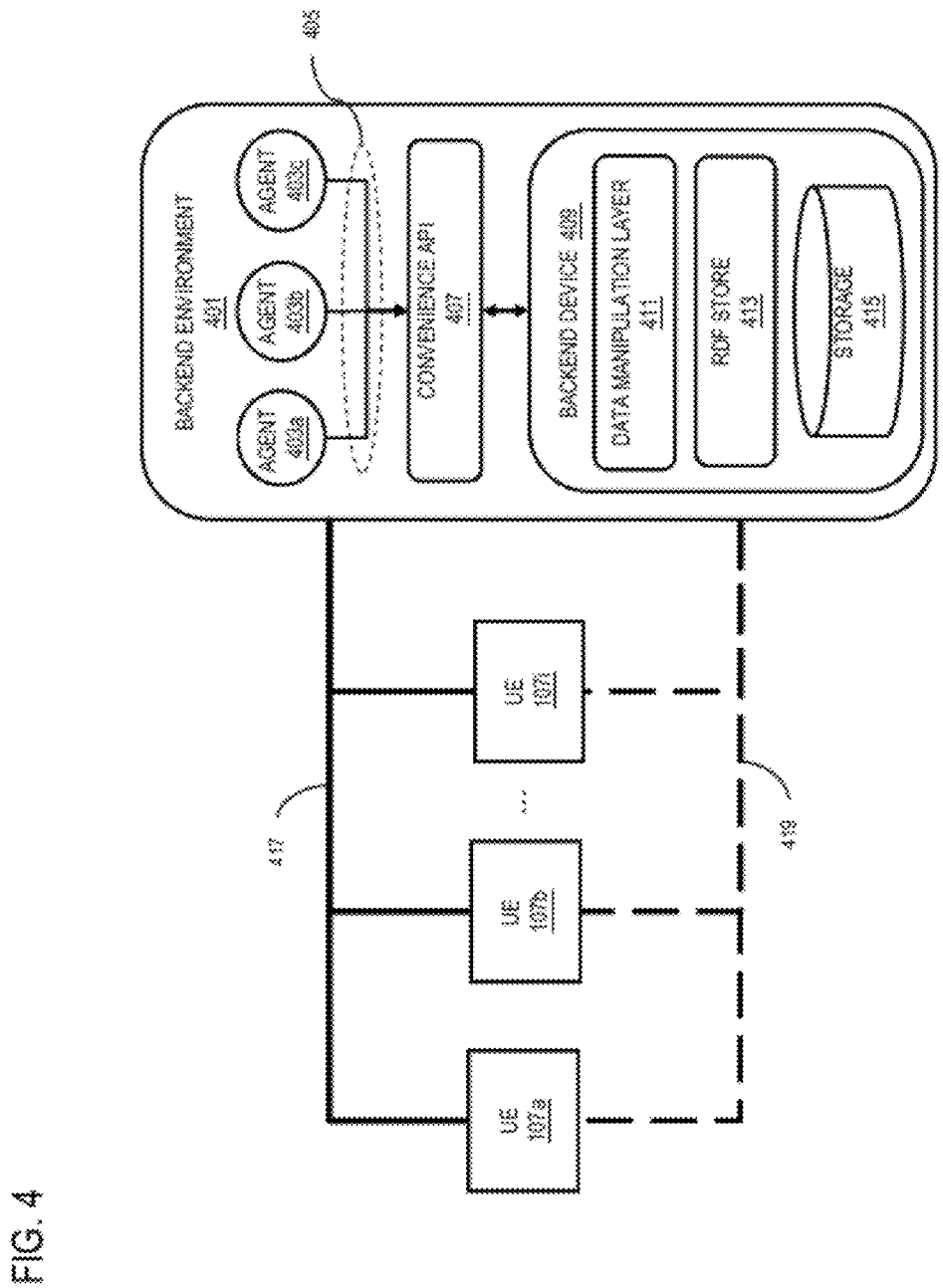
FIG. 4 is a diagram of using information spaces for sharing cognitive radio information, according to one embodiment.

FIG. 4 is a diagram of using cloud environment for sharing cognitive radio information, according to one embodiment. In one embodiment, utilizing cloud environment 111a-111n for sharing cognitive radio information, as described in FIG. 2 and FIG. 3, provides broader information sharing structure than, for example, what WURFL provides. The cognitive radio structure can utilize WURFL as a interoperable service (along with other data sources), wherein the WURFL may access the backend environment 401 and provide direct cognitive radio specific access to UEs 107a, 107b, . . . , 107i with necessary parameters. If, information sharing via WURFL fails to extract and provide various cognitive radio parameters such as location, frequencies, etc. any other suitable data sources (service provides) can be utilized to reconstruct such information or derive it from other data.

In one embodiment, the backend environment 401 is a network infrastructure. The backend environment may also be a virtual run-time environment within a cloud 111a-111n associated with the owner of one or more UEs 107a-107i or on another UE 107b associated with the user. The backend environment 401 may include one or more components (backend devices) 409 and one or more Application Programming Interface (API) such as a convenience API 407 that may include APIs tailored to the software development environments used (e.g. JAVA, PHP, etc.). Furthermore, UEs 107a-107i may include client APIs (not shown) each API enabling interaction between devices and components within another device or an environment. For example, the convenience API 807 enables interaction between the backend device 409 and agents 403a, 403b, and 403c, wherein each agent is a set of processes that handle computations within the backend environment 401. Connections 417 and 419 respectively represent distribution paths of data and control among the environment 401 and UEs 107a-107i. The storage 415 is a repository of information and computations that can be accessed and used by all the UEs and infrastructure components having connectivity to the backend environment 401.

In one embodiment, the backend device 409 may be equipped with a data manipulation layer 411 that monitors and manages any access to the storage 415.

In one embodiment, the cognitive radio management platform 103 extracts cognitive radio specific parameters, by sniffing, interrogation, or a combination thereof, from the backend environment 401 associated with cloud 111a-111n and translates the parameters into specific expressions of the cognitive radio. The cognitive radio management platform 103 may also utilize storage 415, which is part of the information space 113a-113m, for storing shared cognitive radio information, white space database, or a combination thereof.

In one embodiment, one or more UEs 107a, 107b, . . . , 107i may request and inform their (spectrum) findings to the common cognitive radio database (e.g. storage 415 in the backend device 409, storage 211 of cognitive radio management platform 103, backend environment 401, or a combination thereof). In response, the backend device 409 may send settings and other response information back to configure UEs 107a-107i. The cognitive radio management platform 103 (shown in FIG. 1) may monitor correct utilization of the received settings by the UEs 107a-107i at certain locations, under certain regulations, etc.

The backend environment 401 may include several layers (e.g. L1, L2, L3) shown as circle 405, which provide fine instruments for developers to access particular layers for development. The layers 405 describe different abstraction layers attached to different convenience layers, convenience API 407. In one embodiment, the cognitive radio functions can be mapped to level L3 as a cognitive radio domain specific API. The cognitive radio domain can be built based on location, frequency and rules information.

In one embodiment, the cloud 111a-111n may have a platform API, which is specific to mobile applications, defining location, bearer, short range communications, etc., and when cognitive radio specific functions (e.g. cognitive radio domain information) are mapped into the platform API, it forms a cognitive radio specific platform API.

In one embodiment, the Data Manipulation Layer (DML) 411 provides connectivity, privacy, security policies API, which will fetch policy rules from storage 415 or any other storage spaces associated with cloud 111a-111n and apply them to the ongoing data-stream.

In one embodiment, the cognitive radio database information, is based on locations wherein each location may be under certain regulations (legislation), allowing certain frequencies to be used at the location.

In one embodiment, as previously described, there may be two options (functions) for cognitive radio specific operations, namely, sniffing (associated radio sensing and listen before talk) such as for example, transmitting, sniffing vacant channels (channel numbers, characteristics); and interrogation (with local agreement). In the interrogation method, the cognitive radio management platform 103 has knowledge of occupied channels and provides protocols for communication among UEs 107a-107i, including rules, candidate neighbors, operation and measurement configurations, etc.

In one embodiment, sniffing includes scanning the environment, whereas interrogation provides more local and global interactions, also selecting the used setup. Sniffing is a subset of interrogation, as interrogation provides more information.

Figure 5:
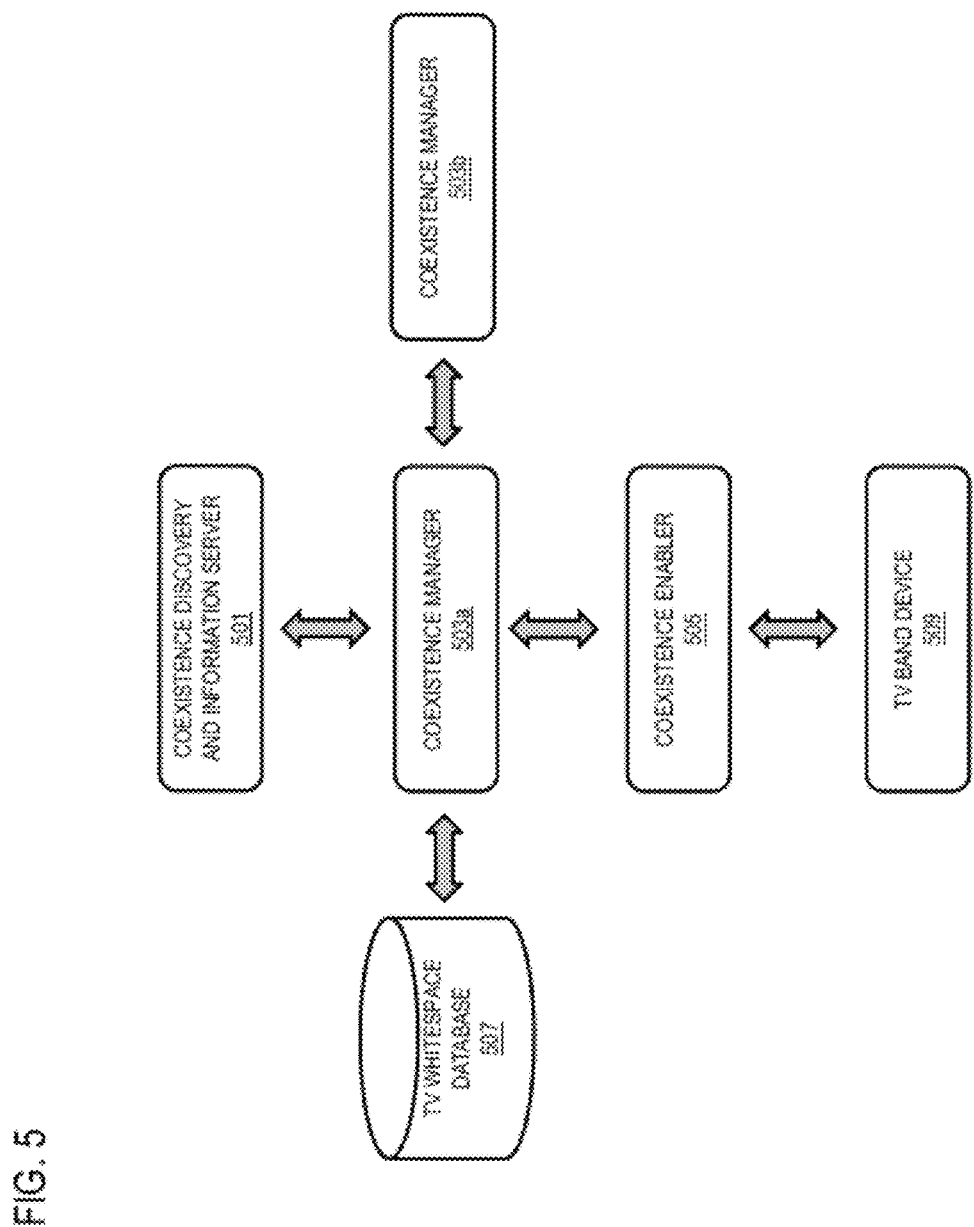
FIG. 5 is a diagram of TV white space cognitive radio architecture, according to one embodiment.

FIG. 5 is a diagram of TV white space cognitive radio architecture, according to one embodiment. In one embodiment the Coexistence Discovery and Information Server (CDIS) 501 supports discovery of Coexistence Managers (CMs) 503a in the network and collects aggregate information from other components of the network, wherein each coexistence manager 503a discovers other CMs 503b, performs decision making processes for coexistence of entities on the band, and supports exchange of information among entities and between different CMs 503a, 503b, etc. Additionally, the CMs 503a and 503b have access to the TV white space database 507 in order to discover other CMs and support exchange of information. The Coexistence Enabler (CE) 505 requests and obtains information, required for coexistence, from the TV-band Device or network (TVBD) 509, wherein TVBDs are new unlicensed radio frequency devices operating in the vacant channels or white spaces. Furthermore, the CE 505 translates reconfiguration requests and/or commands to TVBD specific format. This represents the architecture for TV white space cognitive connectivity, being standardized in IEEE 802.19.

Figure 6:
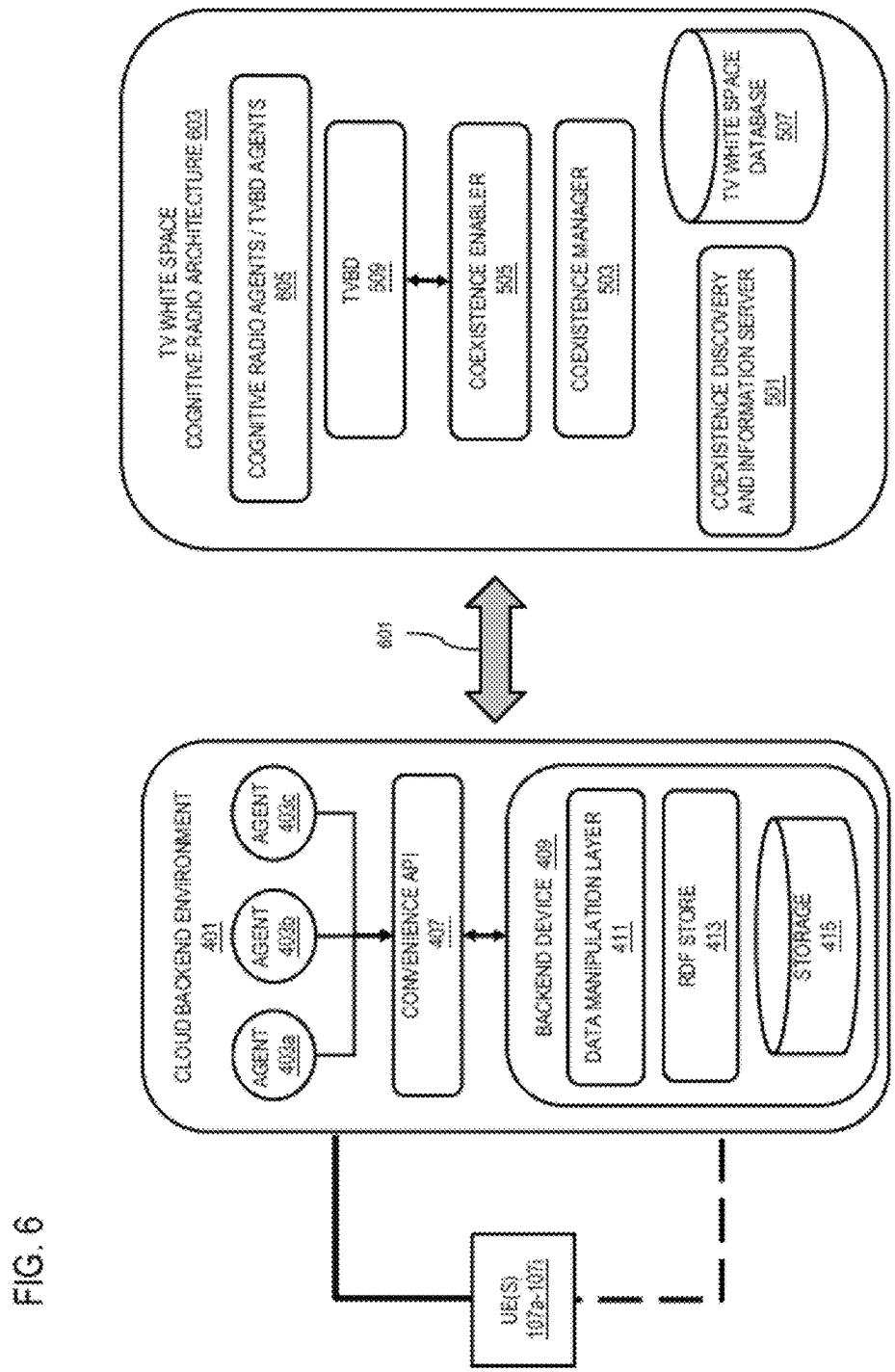
FIG. 6 is a diagram of mapping between information space and cognitive radio environment, according to one embodiment.

FIG. 6 is a diagram of mapping between cloud environment and cognitive radio environment, according to one embodiment. In one embodiment, the cognitive radio enabled UE 107a-107i requests the cloud backend environment 401 generalized representation, wherein the TV white space cognitive radio architecture 603 is mapped to the backend environment 401 (shown as arrow 601).

In one embodiment, the cognitive radio management platform 103 uses sniffing or interrogation methods and reutilizes the methods in the convenience API 407. The cognitive radio specific API may consist of information such as regulations, bandwidth information and their characteristics, etc. in order to provide cognitive radio specific operations, method of choice (e.g. sniff or interrogate the cognitive radio information from the environment 603).

In one embodiment, mapping 601 is performed on the technologies of the CR architecture environment 603 and the cloud backend environment 401. The cognitive radio functionality information, such as for example location, regulation, frequency, etc. which can be extracted from a cognitive radio specific database (not shown) can be mapped to, for example, platform API, so that the technology map is:
Location (CR)→Location API
Legislation/Regulation (CR)→Connectivity/Privacy/Security Policies API
Frequency (CR)→NEW (or Bearer API)

In one embodiment, the cognitive radio specific API may consist of location API, Connectivity/Privacy/Security Policies API, frequency API or a combination thereof. As seen above, the frequency API may be a new API at the backend environment 401. Alternatively, the frequency can be mapped to a current Bearer API (not shown). The cognitive radio management platform 103 may use sniffing, interrogation or a combination thereof to determine vacant and occupied frequencies with support from cloud environment 401.

In one embodiment, for example, a cognitive radio enabled UE 107a may be associated with a specific location and the connectivity, privacy, security policy rules (API, regulation) with tune up parameters attached to the location. In this embodiment, particular information associated with the location can be extracted from the cloud 111a-111n.

In another embodiment, a cognitive radio enabled UE 107b may be associated with a specific location and the connectivity, privacy, security policy rules (API, regulation) with tune up parameters attached to the location and to a selected frequency. In this embodiment, particular information associated with the location and the frequency can be extracted from the cloud 111a-111n.

In one embodiment, a cognitive radio enabled UE 107c may request direct subscription for device to device communication from location parameters, cloud backend environment Data Manipulation Layer 411 figuring equivalent parameters and enabling these devices to communicate directly. If no DML database exists, a wrapper may be used to provide connection to device storage 415.

In one embodiment, a virtual copy of the local findings and settings of cloud based cognitive radio database can be used at UE level (locally) to allow direct device to device (e.g. UE to UE) cognitive radio connections. The two UEs can form a group in which findings and settings are treated as group findings, and are updated to the backend 401 as well.

In one embodiment, personal or private area settings on a UE 107a may be locally available on a Radio Frequency (RF) memory tag (e.g. home mode, wherein the cognitive radio environment may be more static than other outdoor or public environments), where each cognitive radio enabled UE 107a-107i can pull and push settings for that area from/to RF memory tag. In this embodiment, cognitive radio parameters may be determined periodically or at every touch to the RF memory tag and the determined parameters stored in the RF memory tag for later use and for other UEs to use.

Figure 7:
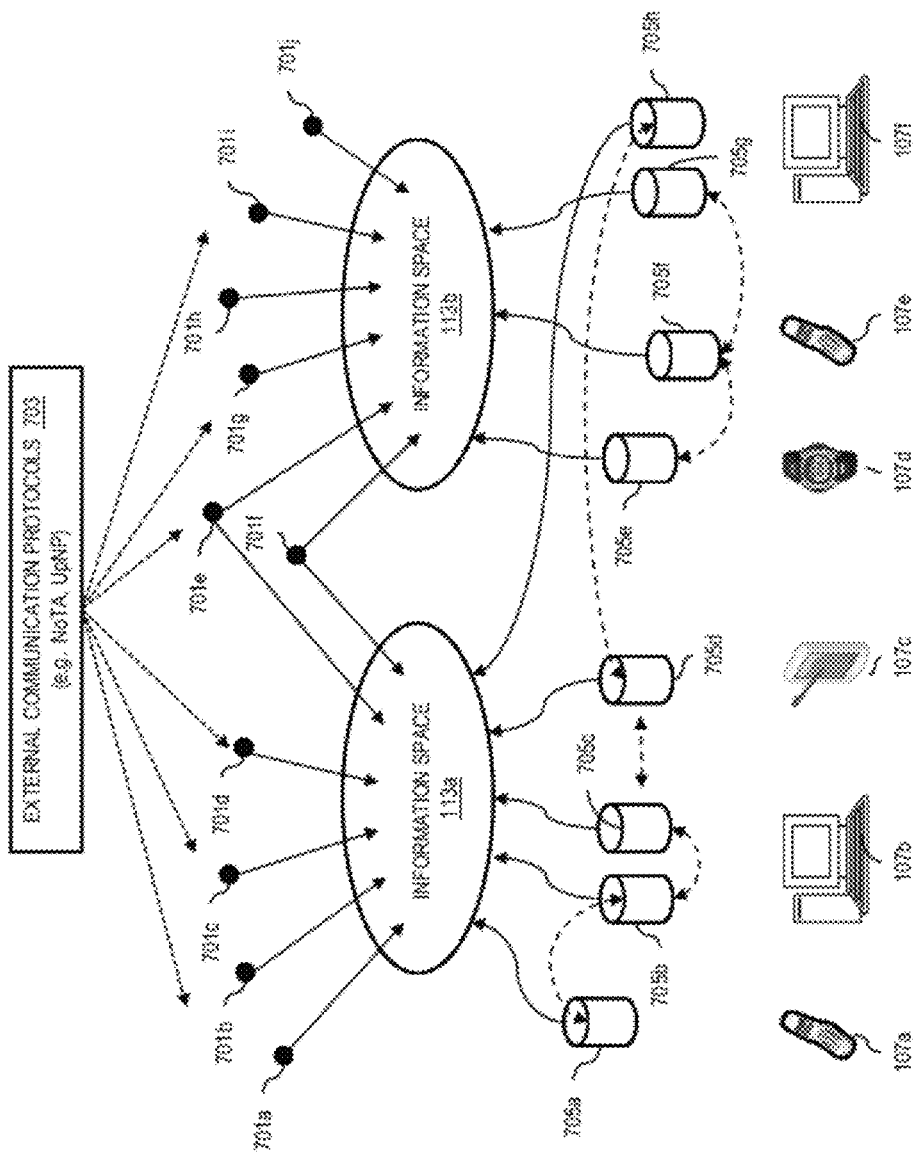
FIG. 7 is a diagram of an architecture for an information space used for providing cognitive radio information sharing, according to one embodiment.

FIG. 7 is a diagram of an information space architecture used for providing cognitive radio information sharing, according to one embodiment. In FIG. 7 two information spaces 113a and 113b are connected to knowledge processors 701a-701j. Some of the knowledge processors such as 701e and 701f are connected to more than one information spaces. In addition, some knowledge processors 701 use external communication protocols 703 outside of the information spaces environment. For example knowledge processors 701c, 701d and 701e may be connected through the NoTA network while knowledge processors 701e, 701g and 701j are connected through UPnP network. The knowledge processors 701a-701j may each consist of components such as user-interfaces, internal logics, connectivity components, etc. (not shown). A knowledge processor 701a-701j may generally run on a single device, even though it may have internal distribution. Such a device may be a mobile device/phone, personal computer, active sensor, Radio Frequency Identification (RFID) tag, etc.

The connectivity component of the knowledge processors 701a-701j (not shown) contains the logic and functionality to communicate to various information spaces 113a-113m. Connectivity is over some network protocol to a semantic information broker (SIB) 705a-705h. A semantic information broker 705a-705h contains the logic for parsing messages and pointers to subscription handlers between the knowledge processors 701a-701j and the information space 113a. A knowledge processor 701a-701j may potentially connect to more than one information spaces at a time thus distributing and synchronising the operations across all connected information spaces.

The basic functionality provided by the connectivity protocols at this level for manipulating information and for connection to an information space 113a-113m is given below:

Insert: insert information in information space 113a-113m (as an RDF graph) atomically (e.g., at the level of the smallest information element of the information space 113a-113m), Retract: remove information from information space 113a-113m (as an RDF graph) atomically, Update: update information on information space 113a-113m (as an RDF graph) atomically—often implemented as a retract and insert through the transaction system, Query: synchronously (blocking) query; retrieve information from information space 113a-113m, Subscribe: asynchronously (persistent, non-blocking) set up a subscription to the information space 113a-113m for a given query, Unsubscribe: terminate a given subscription to information space 113a-113m, Join: request initiation of an interaction session between a knowledge processor 701 and a given information space 113a-113m, Leave: terminate the current interaction sessions between a knowledge processor 701 and the information space 113a-113m.

The information space 113a-113m is "virtual" in nature in the sense that its existence is provided by the underlying semantic information brokers 705a-705h which are the elements that "physically" exist. Within the scope of an information space 113a-113m, capabilities for local reasoning over the information contained in that information space are provided through a deductive closure calculation mechanism (not shown). The mechanisms for managing connections and operations of knowledge processors 701a-701j and for distributing the information around information spaces 113a-113m can be implemented by more than one SIB 705 distributed over different processing elements.

The interaction among knowledge processors 701a-701j and information spaces 113a-113m is accomplished by network connections to one or more SIBs 705a-705h providing or representing the information space. As far as the user or designer of a knowledge processor 701a-701j is concerned, there are knowledge processors 701a-701j and information spaces 113a-113m and the connectivity layer abstracts away the physical connection to a SIB 705a-705h.

Additionally the semantic information brokers 705a-705h may be distributed over a number of different devices 107a-107f. For example, SIB 705a is on device 107a and SIBs 705b and 705c are on device 107b. However as seen in FIG. 7 each set of SIBs represent one information space at a time. For example, SIBs 705a-705d and 705h represent information space 113a while SIBs 705e-705g represent information space 113b. Some devices can run more than one SIB representing different information spaces concurrently. For example device 107f runs SIB 705g which represents information space 113b and at the same time runs the SIB 705h that represents information space 113a.

The system can be implemented on various platforms including mobile devices, personal computers, etc. The main requirement of such implementation platforms is that the devices support the runtime environments and that enough processing power and storage is available. Given that knowledge processors 701a-701j can be distributed over devices with more processing power and/or storage as necessary, usually smaller hand-held devices are adequate for running these knowledge processors.

In one embodiment, a SIB 705a-705h may run on systems supporting the Python runtime environment and additionally versions for C++ specifically exist for Linux/Unix and Open-C for Symbian operating system, the most widely used open operating system for mobile phones. Client libraries for knowledge processors 701a-701j may exist in Python, C, C++(Linux/Unix and Symbian) as well as Java. Other environments based on Web services and Javascript can also be used.

In another embodiment, the system implementations run on Mobile Devices (including: N800/810, N95) and personal computers (Unix, Linux, Windows). The knowledge processors 701a-701j can run on sensors, etc. Communication is made over TCP/IP and HTTP protocols which can be used over Ethernet, GPRS and 3G transports.

The information spaces 113a-113m can be represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. For example, RDF is a family of World Wide Web Consortium (W3C) specifications originally designed as a metadata data model. RDF has come to be used as a general method for conceptual description or modeling of information that is implemented in web resources; using a variety of syntax formats. The underlying structure of any expression in RDF is a collection of triples, each consisting of three disjoint sets of nodes including a subject, a predicate and an object. A subject is an RDF Uniform Resource Identifier (URI) reference (U) or a Blank Node (B), a predicate is an RDF URI reference (U), and an object is an RDF URI reference (U), a literal (L) or a Blank Node (B). A set of such triples is called an RDF graph. Table 1 shows sample RDF triples.

TABLE 1

| Subject | Predicate | Object |
|---|---|---|
| uri://....../rule#CD-introduction, | rdf:type, | uri://............/Rule |
| uri://....../rule#CD-introduction, | uri://....../rule#assumption, | "c" |

The basic operations on an information store are insertion of a graph, retraction (deletion) of a graph, querying and subscription for information. Insertion and retractions may be combined into a single transactional structure in order to admit atomic updates through the atomic application of retract and insert. All other forms of operations are constructions and refinements of the above. For example, update is constructed out of a set of retracts and inserts. Further rewrite rules can simplify the recurrent application of operations.

In one embodiment, a query is evaluated based on the current snapshot of the information in the information space 113a-113m. Queries can be performed by Wilbur query language (WQL) or simple RDF triple pattern matching. WQL is a lisp-like path based query language. One important difference between WQL and RDF triple pattern matching is that Wilbur's static reasoning engine only runs with WQL queries. WQL queries return a set of RDF graph nodes, while the pattern queries return an RDF graph. Furthermore, other query languages such as SPARQL are also supported.

In another embodiment, subscriptions are implemented as persistent queries, that is, a given query is evaluated whenever the information in the information space 113a-113m changes, and thus the same methods are available. The results are transmitted to the knowledge processors 701a-701j only when they are changed. Depending on parameters, either the full results or a differential is transmitted.

According to the stated ontologies, no attempt is made by the information space 113a-113m to enforce consistency or integrity of information. However, internal reasoning knowledge processors (not shown) may be present which can perform this activity if the information space 113a-113m has been configured accordingly. Information is explicitly semi-structured and may take on any form that the knowledge processors 701a-701j insert or retract.

Presence of typing constructs and namespaces does not necessarily mean that a knowledge processor 701 querying for that information will interpret the information according to the implied ontology. A namespace is an abstract container or environment created to hold a logical grouping of unique identifiers or symbols (e.g. names). The semantics of the information is interpreted by the reader, merely implied by the writer and grounded in the real world context of the knowledge processors 701a-701j. Therefore, any two given knowledge processors may disagree about the semantics. This concept is generally referred to as pragmatic or intentional semantics.

The information spaces 113a-113m provide further functionality regarding the joining and leaving of knowledge processors 701a-701j and policy management. Knowledge processors 701a-701j have a set of credentials which are passed during the "join" operation. The counterparts of the knowledge processor 701a-701j instantiated "leave" and "join" operations are the information spaces 113a-113m instantiated "invite" and "remove" operations. These operations are not necessarily provided by every information space 113a-113m nor understood by every knowledge processor 701a-701j.

Connectivity is provided through a set of listeners which provide access via any given specified transport protocol.

TCP/IP is the most used transport, but a Bluetooth based listener or one that uses HTTP/S have also been developed. Listeners can provide pre-processing of the incoming messages if necessary; for example with Bluetooth profiles. Any number of listeners may be provided at any time (at least one is necessary).

Furthermore and in some respects similar to that of the principles of information distribution, the connectivity of an information space 113a-113m can also be seen as a union of all listeners in all SIBs 705a-705h. However, not all listeners may be available on all physical locations (consider Bluetooth or TCP/IP over WLAN for example).

In one embodiment, the cognitive radio management platform 103, performs the process described by the flowchart 300 of FIG. 3 to manage cognitive radio information sharing among cognitive radio enabled devices 107a-107f using the information spaces 113a-113m, wherein the information spaces 113a-113m are configured based on the architecture described in FIG. 7.

The processes described herein for providing cognitive radio information sharing may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide cognitive radio information sharing as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic, nanotechnological and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing cognitive radio information sharing.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing cognitive radio information sharing. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing cognitive radio information sharing. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing cognitive radio information sharing, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing cognitive radio information sharing to the UEs in sets 101*a*-101*n*.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

Figure 9:
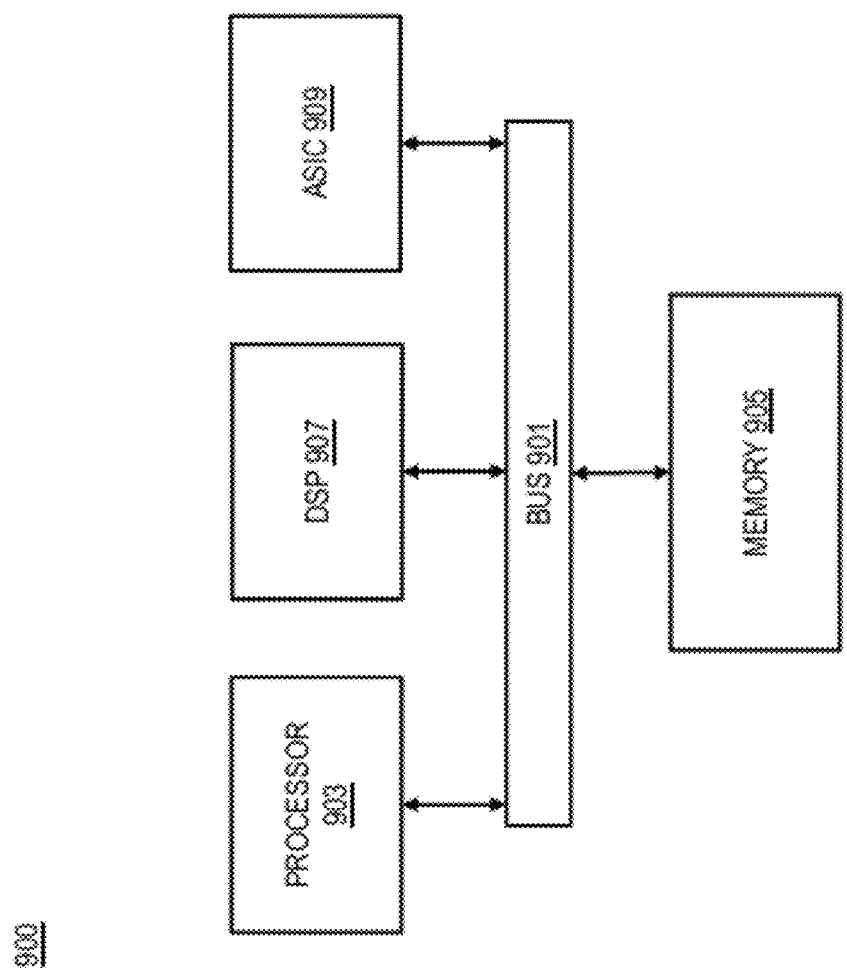
FIG. 9 is a diagram of a chip set that can be used to implement an embodiment of the invention.

FIG. 9 illustrates a chip set or chip 900 upon which an embodiment of the invention may be implemented. Chip set 900 is programmed to provide cognitive radio information sharing as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing cognitive radio information sharing.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide cognitive radio information sharing. The memory 905 also stores the data associated with or generated by the execution of the inventive steps.

Figure 10:
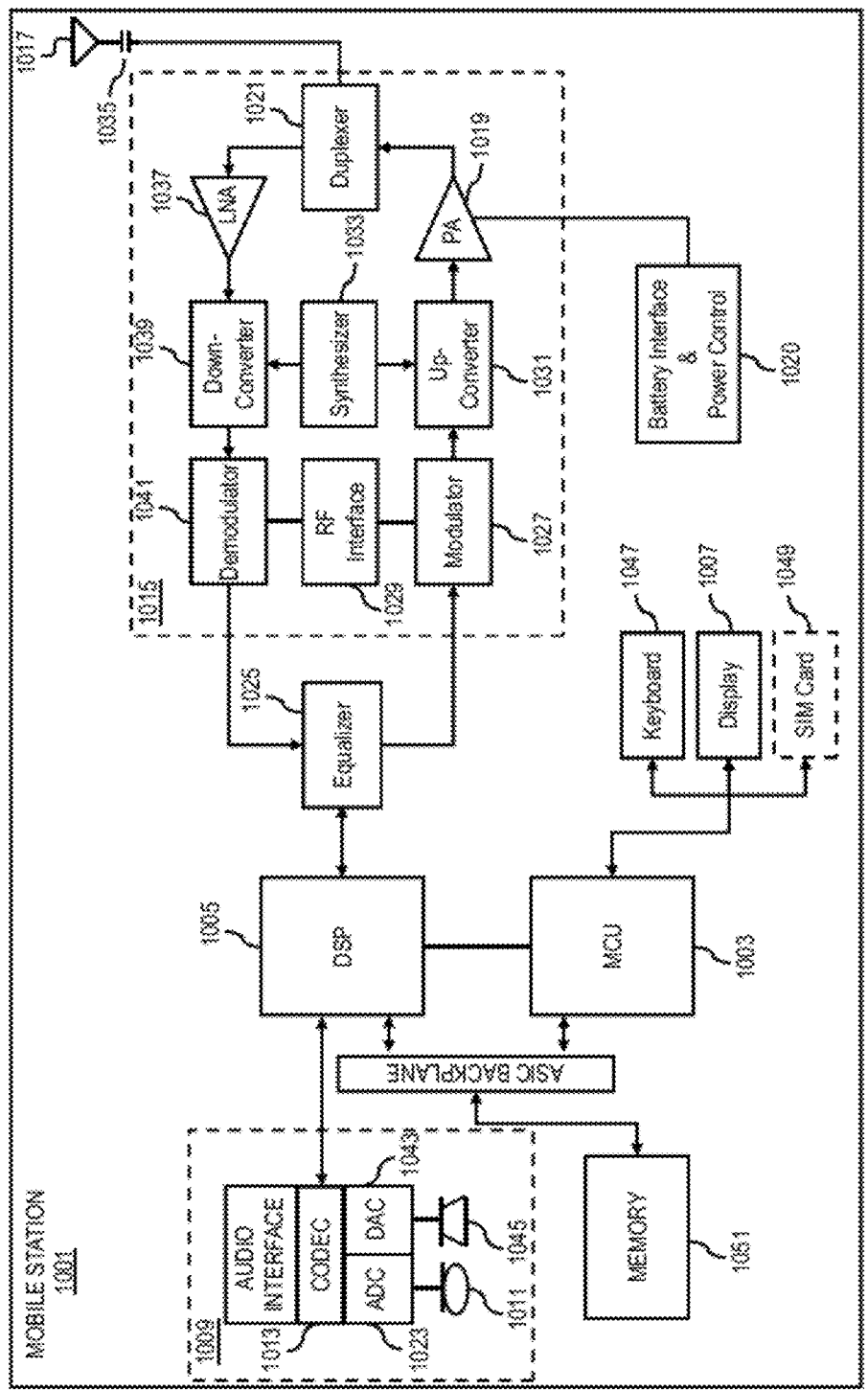
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of providing cognitive radio information sharing. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing cognitive radio information sharing. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide cognitive radio information sharing. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   one or more cognitive radio parameters associated with one or more locations; and
   a translation and storage of the one or more cognitive radio parameters in at least one distributed information space constituted by one or more namespaces,
   wherein the one or more namespaces within the at least one distributed information space are accessible to one or more cognitive radio devices.

2. A method of claim 1, wherein the one or more cognitive radio parameters include, at least in part, one or more regulations, one or more frequencies, or a combination thereof for communicating among the one or more radio devices at the one or more locations.

3. A method of claim 1, wherein the (1) data and/or (2) information and/or (3) at least one signal are further based, at least in part, on the following:
   a processing of the one or more cognitive radio parameters to determine a sniffing method, an interrogation method, or a combination thereof for determining one or more other cognitive radio parameters associated with the one or more locations, one or more other locations, or a combination thereof;

at least one determination of the one or more other parameters based, at least in part, on the at least one method; and a storage of the one or more other parameters in the at least one distributed information space.

4. A method of claim 1, wherein the (1) data and/or (2) information and/or (3) at least one signal are further based, at least in part, on the following:

a processing of the at least one distributed information space to determine one or more capabilities of the one or more cognitive radio devices, wherein an operation of at least one of the one or more cognitive radio devices is based, at least in part, on the one or more capabilities.

5. A method of claim 4, wherein the (1) data and/or (2) information and/or (3) at least one signal are further based, at least in part, on the following:

at least one determination of at least one of the one or more capabilities from an external data source associated with the distributed information space.

6. A method of claim 1, wherein the (1) data and/or (2) information and/or (3) at least one signal are further based, at least in part, on the following:

a processing of the least one distributed information space to cause, at least in part, configuring of one or more cognitive radio operations based, at least in part, on the one or more locations, the one or more cognitive radio parameters, the one or more capabilities, or a combination thereof.

7. A method of claim 1, wherein the (1) data and/or (2) information and/or (3) at least one signal are further based, at least in part, on the following:

one or more connectivity policies, one or more privacy policies, one or more security policies, or a combination thereof associated with the one or more cognitive radio parameters, the one or more locations, the one or more cognitive radio devices, or a combination thereof, wherein access to the at least one distributed information space is based, at least in part, on the one or more connectivity policies, one or more privacy policies, the one or more security policies, or a combination thereof.

8. A method of claim 1, wherein the (1) data and/or (2) information and/or (3) at least one signal are further based, at least in part, on the following:

at least one determination to provide, at least in part, access to at least one copy of the at least one distributed information space to at least one of the one or more cognitive radio devices, wherein the at least one copy of the at least one information supports device-to-device communication among the one or more cognitive radio devices.

9. A method of claim 1, wherein the at least one distributed information space extends, at least in part, to include one or more radio frequency memory tags for storing personal information, private information, or a combination thereof associated with the at least one distributed information space, the one or more cognitive radio parameters, the one or more locations, the one or more cognitive radio devices, or a combination thereof.

10. A method of claim 1, wherein the one or more cognitive radio devices include one or more television band devices.

11. An apparatus comprising:
at least one processor; and
at least one memory including computer program code for one or more programs, the at least one memory and the computer program code configured to, with the at least one processor, cause the apparatus to perform at least the following, determine one or more cognitive radio parameters associated with one or more locations; and cause, at least in part, a translation and storage of the one or more cognitive radio parameters in at least one distributed information space constituted by one or more namespaces, wherein the one or more namespaces within the at least one distributed information space are accessible to one or more cognitive radio devices.

12. An apparatus of claim 11, wherein the one or more cognitive radio parameters include, at least in part, one or more regulations, one or more frequencies, or a combination thereof for communicating among the one or more radio devices at the one or more locations.

13. An apparatus of claim 11, wherein the apparatus is further caused to:

process and/or facilitate a processing of the one or more cognitive radio parameters to determine a sniffing method, an interrogation method, or a combination thereof for determining one or more other cognitive radio parameters associated with the one or more locations, one or more other locations, or a combination thereof;

cause, at least in part, determination of the one or more other parameters based, at least in part, on the at least one method; and cause, at least in part, storage of the one or more other parameters in the at least one distributed information space.

14. An apparatus of claim 11, wherein the apparatus is further caused to:

process and/or facilitate a processing of the at least one distributed information space to determine one or more capabilities of the one or more cognitive radio devices, wherein an operation of at least one of the one or more cognitive radio devices is based, at least in part, on the one or more capabilities.

15. An apparatus of claim 14, wherein the apparatus is further caused to:

determine at least one of the one or more capabilities from an external data source associated with the distributed information space.

16. An apparatus of claim 11, wherein the apparatus is further caused to:

process and/or facilitate a processing of the least one distributed information space to cause, at least in part, configuring of one or more cognitive radio operations based, at least in part, on the one or more locations, the one or more cognitive radio parameters, the one or more capabilities, or a combination thereof.

17. An apparatus of claim 11, wherein the apparatus is further caused to:

determine one or more connectivity policies, one or more privacy policies, one or more security policies, or a combination thereof associated with the one or more cognitive radio parameters, the one or more locations, the one or more cognitive radio devices, or a combination thereof, wherein access to the at least one distributed information space is based, at least in part, on the one or more connectivity policies, one or more privacy policies, the one or more security policies, or a combination thereof.

18. An apparatus of claim 11, wherein the apparatus is further caused to:

determine to provide, at least in part, access to at least one copy of the at least one distributed information space to at least one of the one or more cognitive radio devices, wherein the at least one copy of the at least one information supports device-to-device communication among the one or more cognitive radio devices.

19. An apparatus of claim 11, wherein the at least one distributed information space extends, at least in part, to include one or more radio frequency memory tags for storing personal information, private information, or a combination thereof associated with the at least one distributed information space, the one or more cognitive radio parameters, the one or more locations, the one or more cognitive radio devices, or a combination thereof.

20. An apparatus of claim 11, wherein the one or more cognitive radio devices include one or more television band devices.

* * * * *